United States Patent
Fujiki

(10) Patent No.: US 10,158,774 B2
(45) Date of Patent: Dec. 18, 2018

(54) IMAGE PROCESSING APPARATUS

(71) Applicant: KYOCERA Document Solutions Inc., Osaka-shi, Osaka (JP)

(72) Inventor: Atsushi Fujiki, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/873,016

(22) Filed: Jan. 17, 2018

(65) Prior Publication Data

US 2018/0205833 A1   Jul. 19, 2018

(30) Foreign Application Priority Data

Jan. 18, 2017   (JP) ................. 2017-006627

(51) Int. Cl.

| | | |
|---|---|---|
| *G06F 3/12* | (2006.01) | |
| *H04N 1/00* | (2006.01) | |
| *G06K 9/03* | (2006.01) | |
| *G06F 17/30* | (2006.01) | |
| *G06K 9/34* | (2006.01) | |
| *G06K 9/00* | (2006.01) | |
| *G06K 9/32* | (2006.01) | |

(Continued)

(52) U.S. Cl.
CPC ..... *H04N 1/0044* (2013.01); *G06F 17/30244* (2013.01); *G06K 9/00463* (2013.01); *G06K 9/033* (2013.01); *G06K 9/3216* (2013.01); *G06K 9/3233* (2013.01); *G06K 9/342* (2013.01); *G06K 9/36* (2013.01); *G06K 9/46* (2013.01); *H04N 1/00331* (2013.01); *G06K 2209/01* (2013.01); *H04N 2201/0094* (2013.01)

(58) Field of Classification Search
CPC ............ H04N 1/0044; H04N 1/00331; H04N 2201/0094; G06F 17/30244; G06K 9/033; G06K 9/342; G06K 2209/01
USPC ........................................................ 358/1.15
See application file for complete search history.

(56) References Cited

U.S. PATENT DOCUMENTS 9,292,739 B1 *   3/2016   Gray ...................... G06K 9/033
2006/0232836 A1   10/2006   Yamada et al.
(Continued)

FOREIGN PATENT DOCUMENTS

JP   H05-344314 A   12/1993
JP   2006-277056 A   10/2006

*Primary Examiner* — Neil R McLean
(74) *Attorney, Agent, or Firm* — Viering, Jentschura & Partner mbB

(57) ABSTRACT

This image processing apparatus performs image processing on image data, and includes an edit-region identifying section identifying a user-specified region in the image data as an edit region, a character-position identifying section identifying the positions of individual characters in the image data, a character-region generating section generating a character region for each of the characters whose positions have been identified by the character-position identifying section, an edit-character-string identifying section identifying an edit character string based on candidate characters identified by determining the degree of overlay between the edit region and character region, and an image processing unit performing image processing on the edit character string identified by the edit-character-string identifying section.

12 Claims, 9 Drawing Sheets

(51) Int. Cl.
*G06K 9/36* (2006.01)
*G06K 9/46* (2006.01)

(56) References Cited

U.S. PATENT DOCUMENTS

| 2016/0004682 A1* | 1/2016 | Nakatsuka | G06F 17/245 |
| | | | 715/228 |
| 2016/0005203 A1* | 1/2016 | Kawasaki | G06T 11/60 |
| | | | 382/163 |

* cited by examiner

IMAGE PROCESSING APPARATUS

CROSS REFERENCE TO RELATED APPLICATIONS

This application claims priority to Japanese Patent Application No. 2017-006627, which was filed on Jan. 18, 2017, and is incorporated herein by reference in its entirety.

BACKGROUND

This disclosure relates to an image processing apparatus that identifies a user-specified area on a document read and captured or on electric data to edit a character string in the user-specified area.

There are already proposed technologies that identify a user-specified region specified using a highlighter pen and edit information in the user-specified region, and technologies that edit information in the user-specified region specified using a preview.

SUMMARY

The image processing apparatus of the present disclosure performs image processing on image data, and includes an edit-region identifying section identifying a user-specified region in the image data as an edit region, a character-position identifying section identifying the positions of individual characters in the image data, a character-region generating section generating a character region for each of the characters whose positions have been identified by the character-position identifying section, an edit-character-string identifying section identifying an edit character string based on candidate characters that are identified by determining the degree of overlay between the edit region and character region, and an image processing unit performing image processing on the edit character string identified by the edit-character-string identifying section.

The edit-character-string identifying section in the image processing apparatus of this discloser can calculate an overlay ratio, representing how much of a character region is overlaid on the edit region, for each of the character regions, and can identify a character having an overlay ratio equal to or greater than a predetermined overlay threshold as a candidate character.

In the image processing apparatus of this disclosure, the number of the candidate characters to be identified by the edit-character-string identifying section may be limited to a predetermined range.

In the image processing apparatus of this disclosure, the edit-character-string identifying section can identify the centroids of the individual character regions, and identify a character whose centroid is positioned in the edit region as a candidate character.

In the image processing apparatus of this disclosure, the edit-character-string identifying section can calculate an occupancy ratio, representing how much of the candidate characters occupy a word, for every word positioned in the edit region, and identify a word occupied with the candidate characters at an occupancy ratio equal to or greater than a predetermined occupancy threshold as an edit character string.

In the image processing apparatus of this disclosure, if there is no word occupied with the candidate characters at an occupancy ratio equal to or greater than the occupancy threshold, the edit-character-string identifying section can identify the candidate characters as an edit character string.

In the image processing apparatus of this disclosure, the edit-character-string identifying section can identify a word occupied at an occupancy ratio less than the occupancy threshold as an edit character string if the word has an overlap ratio, representing how much of the word overlaps the edit region in a line direction, equal to or greater than a predetermined overlap threshold.

In the image processing apparatus of this disclosure, when an edit unit is set, the edit-character-string identifying section can identify the edit character string on the basis of the edit unit.

In the image processing apparatus of this disclosure, the color and pattern of the color mark, which indicates the user-specified region, can be associated in advance with the edit unit, and the edit unit can be set in accordance with the color and pattern of the color mark.

In the image processing apparatus of this disclosure, the character-region generating section can generate a predetermined figure enclosing a character in a minimal area as the character region.

In the image processing apparatus of this disclosure, the character-region generating section can generate the character region for characters positioned in the edit region.

DETAILED DESCRIPTION

Figure 1:
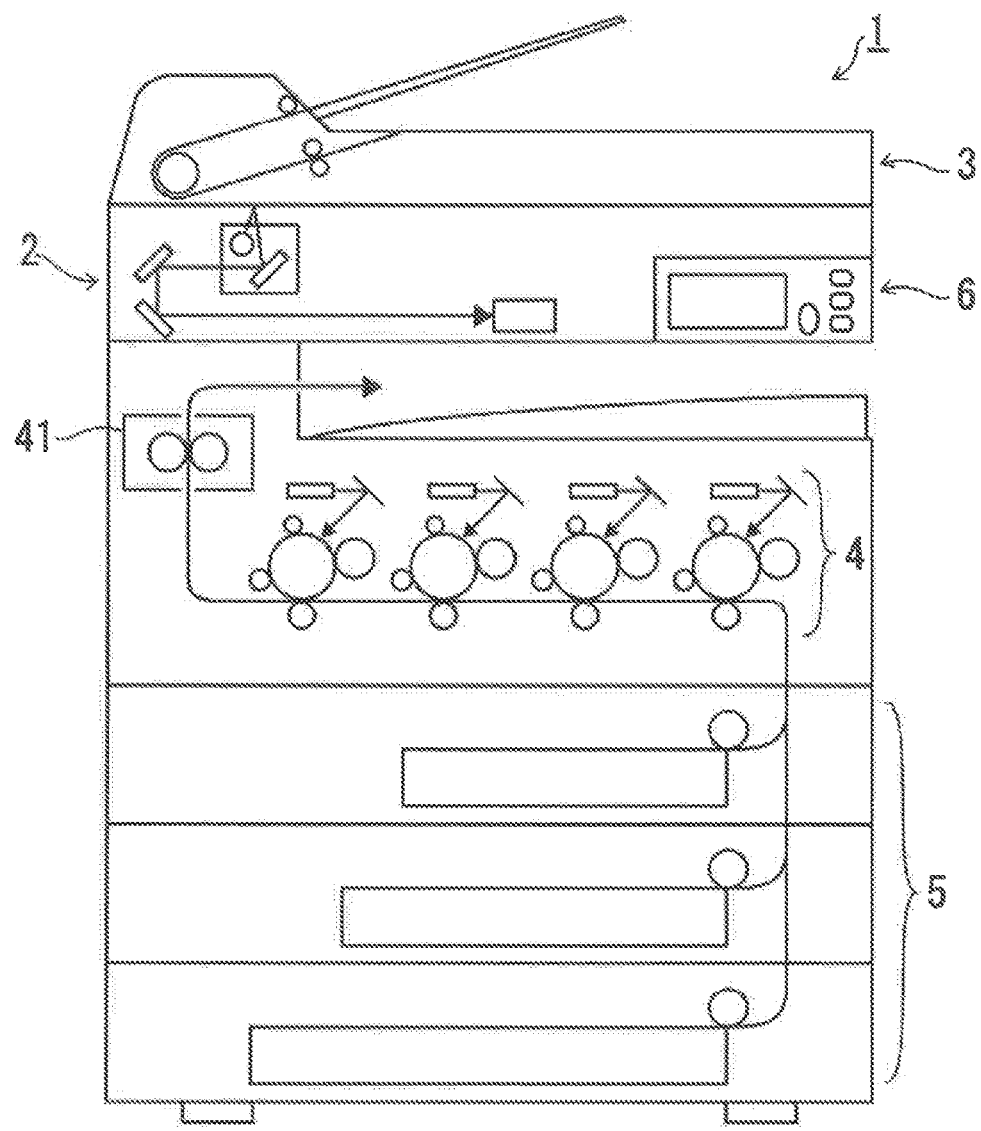
FIG. 1 is a schematic sectional side elevation showing the internal configuration of the image processing apparatus according to an embodiment of the present disclosure.

With reference to the drawings, an embodiment of the present disclosure will be described in detail below. In the embodiment, elements having like functions will be denoted by like reference numerals.

The image processing apparatus 1 according to the embodiment is an image forming apparatus typified by, for example, a copier and an multi-functional printer (MFP), and, with reference to FIG. 1, includes a document reading unit 2, a document feeding unit 3, an image forming unit 4, a paper feeding unit 5, and an operation unit 6.

The document reading unit 2 includes a light source that emits light to a document placed on a document table or fed by the document feeding unit 3, and a photoelectric converter which may be a CCD that converts reflected light from the document into image data of the document. The document reading unit 2 herein supports color printing, and therefore is capable of reading RGB image data.

The image forming unit 4 forms a toner image based on print data, and transfers the formed toner image onto paper fed by the paper feeding unit 5. The image forming unit 4 repeatedly performs an electrostatic latent image forming process for yellow, magenta, cyan, and black to form a yellow toner image, a magenta toner image, a cyan toner image, and a black toner image, respectively, and then overlays these images on top of each other to form a color image on paper.

The operation unit 6 has a function as a display unit for displaying the conditions of the image processing apparatus 1 and some other information, and a function as an input unit for accepting settings and operational instructions to the image processing apparatus 1, and is composed of various keys, a touch panel, and so on.

Figure 2:
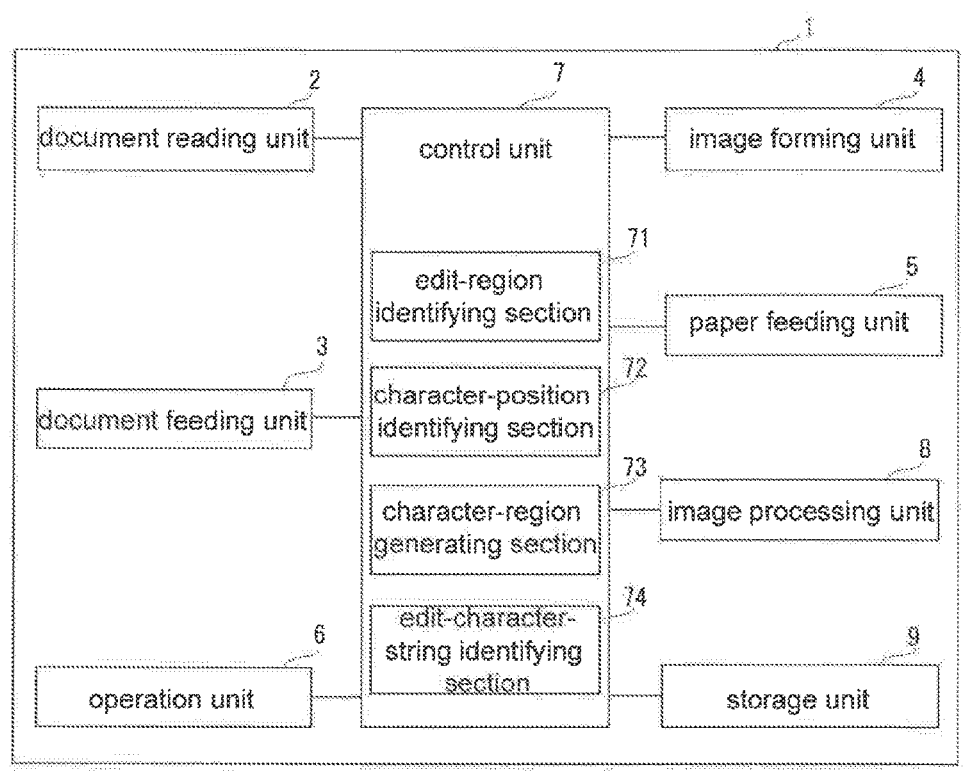
FIG. 2 is a block diagram schematically showing the configuration of the image processing apparatus according to the embodiment of the disclosure.
Figure 3:
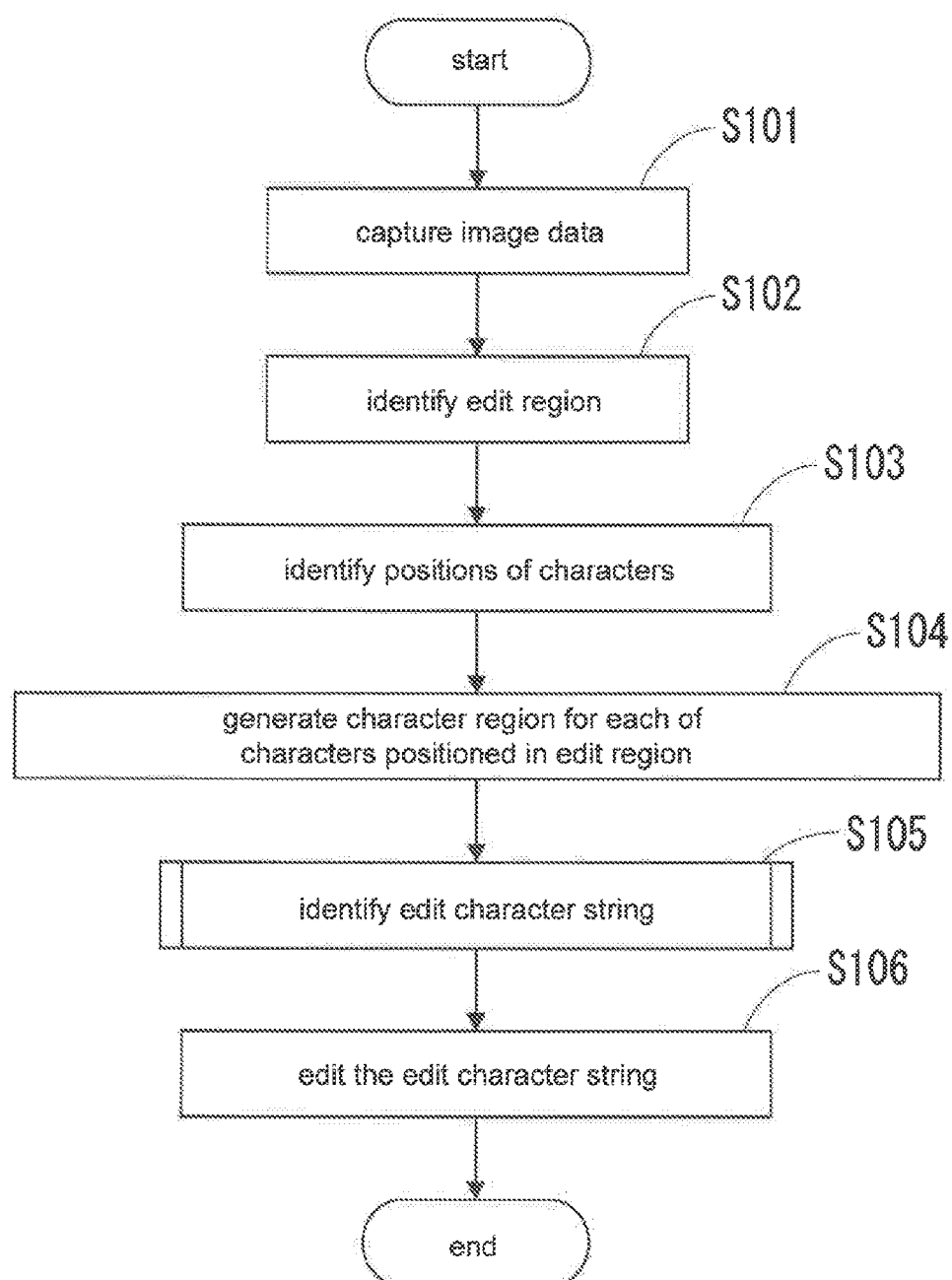
FIG. 3 is a flowchart illustrating area editing operations by a control unit in FIG. 2.

FIG. 2 is a block diagram schematically showing the configuration of the image processing apparatus 1. The aforementioned document reading unit 2, document feeding unit 3, image forming unit 4, paper feeding unit 5, and operation unit 6 are connected to a control unit 7 that controls their operations. In addition, the control unit 7 is connected to an image processing unit 8 and a storage unit 9.

The control unit 7 is an information processing unit, like a microcomputer, including a central processing unit (CPU), a read only memory (ROM), a random access memory (RAM), and some other components. The ROM stores control programs for controlling the operation of the image processing apparatus 1. The CPU of the control unit 7 retrieves a control program stored in the ROM, and expands it on the RAM to control the entire apparatus in response to an instruction input through the operation unit 6. The control unit 7 functions as an edit-region identifying section 71, a character-position identifying section 72, a character-region generating section 73, and an edit-character-string identifying section 74.

The edit-region identifying section 71 analyzes image data to identify a user-specified region, which is indicated with a color mark on a document, as an edit region X. For example, if the document is a black-and-white document, the edit-region identifying section 71 distinguishes a color region from black-and-white regions to identify the edit region X. On the other hand, if the document is a color document, the edit-region identifying section 71 can identify the edit region X by conventional methods utilizing the difference in reflectance between a specified region marked with a highlighter (fluorescent marker) and a color document image to be read. The user-specified region identified as an edit region X by the edit-region identifying section 71 may be specified using a preview.

The character-position identifying section 72 recognizes the positions of individual characters in image data, and also recognizes words and sentences based on a space between characters, colons, semicolons, commas, and periods (punctuation in the case of Japanese).

The character-region generating section 73 generates a character region Y for each of the characters whose positions have been identified by the character-position identifying section 72. In this embodiment, the character region Y generated by the character-region generating section 73 is a rectangle taking up a minimal area to enclose a character. The character region Y is generated for characters positioned in the edit region X identified by the edit-region identifying section 71. The shape of the character region Y is not limited to a rectangle, and can be any other shapes, such as an ellipse or a polygon. In addition, the shape of the character region Y can be different for every character.

The edit-character-string identifying section 74 identifies a character string to be edited, which is hereinafter referred to as an edit character string, based on the edit region X identified by the edit-region identifying section 71 and the character region Y generated by the character-region generating section 73.

The image processing unit 8 is a means for performing predetermined image processing on image data, for example, scaling, tone adjustment, and density adjustment. The image processing unit 8 also performs various types of image processing, such as deletion, color conversion, cropping, OCR processing, reversing, masking, and shading, on the edit character string identified by the edit-character-string identifying section 74.

The storage unit 9 is a storage means, such as a semiconductor memory and a hard disk drive (HDD), and stores image data, which is acquired by the document reading unit 2 and used as print data.

Description will be made about how the control unit 7 operates region editing by referring to FIGS. 3 and 6A to 6D.

Figure 4:
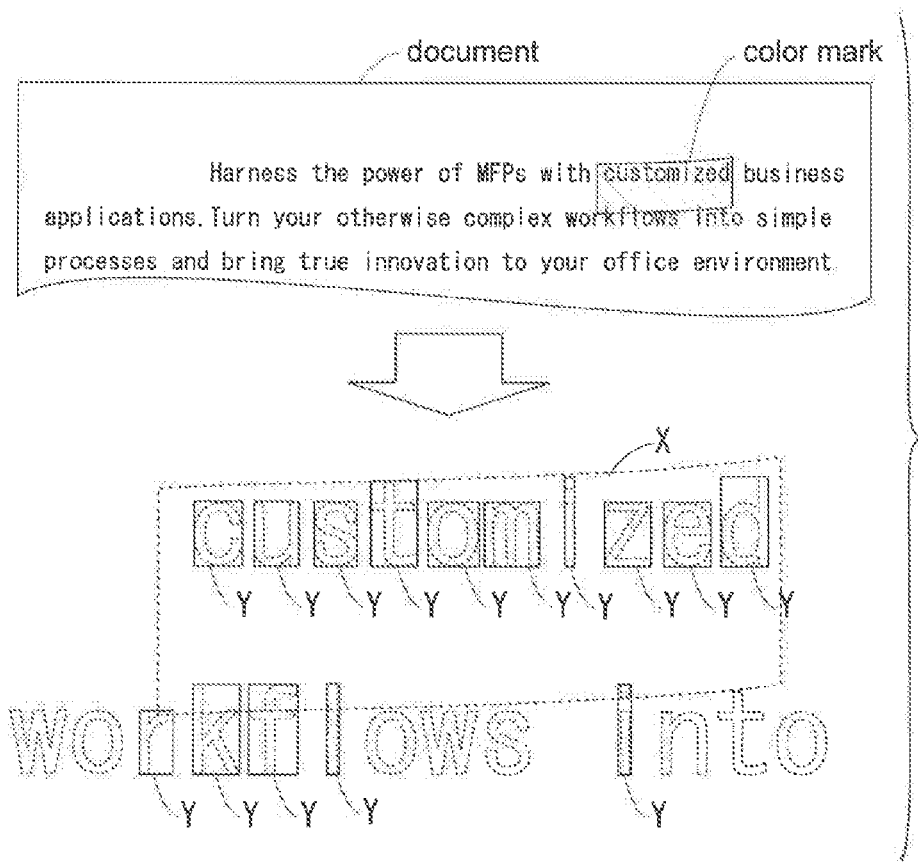
FIG. 4 is a diagram illustrating the area editing operations by the control unit in FIG. 2.

A user loads a document, which contains a region specified with a color mark as shown in FIG. 4, into the document feeding unit 3, and inputs an instruction to read the document through the operation unit 6. The color mark applied to specify the region may be a fill pattern in which the whole region is filled in by a highlighter, or an enclosure pattern in which the region is enclosed by a highlighter or a felt pen.

Upon accepting the reading instruction made through the operation unit 6, the control unit 7 controls the document feeding unit 3 to start feeding the document and controls the document reading unit 2 to capture image data of the document fed from the document feeding unit 3 (step S101).

In turn, the control unit 7 functions as the edit-region identifying section 71. The edit-region identifying section 71 analyzes the image data, and, as shown in FIG. 4, identifies the region specified by the color mark on the document as an edit region X (step S102).

Then, the control unit 7 functions as the character-position identifying section 72. The character-position identifying section 72 identifies the positions of individual characters within the image data and also recognizes words and sentences (step S103).

Then, the control unit 7 functions as the character-region generating section 73. The character-region generating section 73 generates character regions Y, as shown in FIG. 4, for individual characters positioned in the edit region X identified in step S102 (step S104).

Next, the control unit 7 functions as the edit-character-string identifying section 74. The edit-character-string identifying section 74 identifies an edit character string based on the edit region X identified in step S102 and the character regions Y generated in step S104 (Step S105). The method of identifying the edit character string will be described later.

The image processing unit 8 performs image processing, such as deletion, color conversion, cropping, reversing, masking, and shading, on the edit character string identified in step S105 (step S106), and completes the region editing operations. The image processing carried out in step S106 may be selected by the user; however, it is more preferable to perform image processing corresponding to the color and pattern (fill pattern or enclosure pattern) of the color mark. In this case, image processing to be performed is associated with the color and pattern of the color mark in advance, and when the edit region X is identified in step S102, image processing to be performed on an edit character string in the identified edit region X can be set.

Next, description will be made about how an edit character string is identified in step S105.

Figure 5:
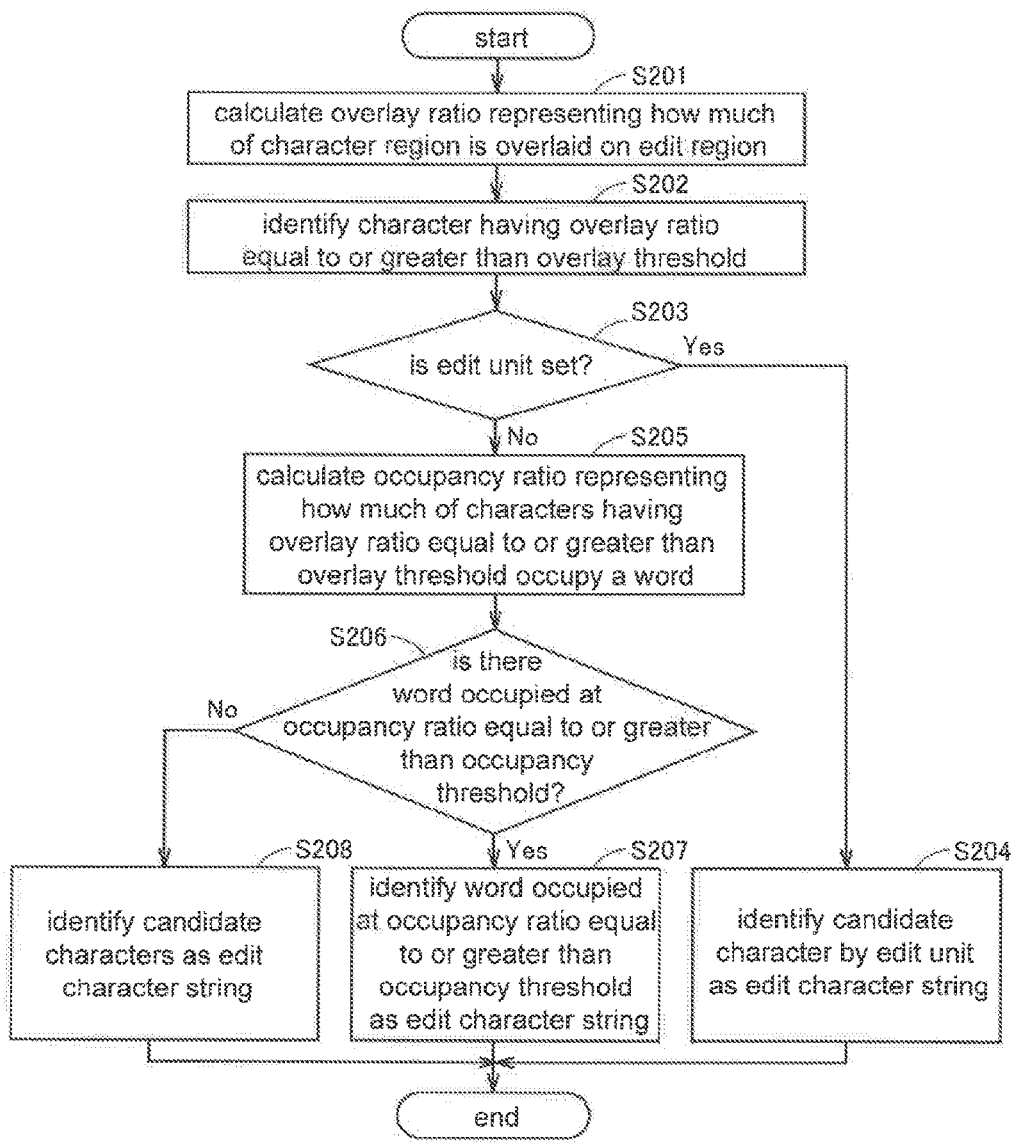
FIG. 5 is a flow chart illustrating how an edit-character-string identifying section shown in FIG. 2 identifies an edit character string.

Referring to FIG. 5, the edit-character-string identifying section 74 calculates an overlay ratio, which represents how much of a character region Y is overlaid on the edit region X, for each of the character regions Y (step S201). The overlay ratio is obtained by dividing the area of a part of a character region Y overlaid on the edit region X by the whole area of the character region Y.

Next, the edit-character-string identifying section 74 identifies a character having an overlay ratio that is equal to or greater than a predetermined overlay threshold (0.5 in this embodiment) as a candidate character (step S202). In step S202, the number of the candidate characters to be identified may be limited to a predetermined range. In this case, a predetermined number of the candidate characters are identified in decreasing order of the overlay threshold. Alternatively, the edit-character-string identifying section 74 identifies the centroid of a character region Y, instead of the overlay ratio, and identifies a character having the centroid positioned in the edit region X as a candidate character in step S202.

In the example shown in FIG. 4, all the characters of the word "customized", the characters "rkfl" of the word "workflows", and the character "i" of the word "into" are positioned in the edit region X, and only the characters "customized" are identified as candidate characters in step S202.

FIGS. 6A to 6D show examples of different edit regions X identified.

Figure 6A:
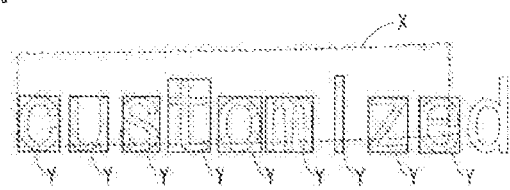
FIG. 6A is a diagram illustrating the edit-character-string identifying operations by the edit-character-string identifying section in FIG. 2.

In the example shown in FIG. 6A, the characters "customize" of the word "customized" are positioned in the edit region X, and the characters "customize" of the word "customized" are identified as candidate characters in step S202.

Figure 6B:
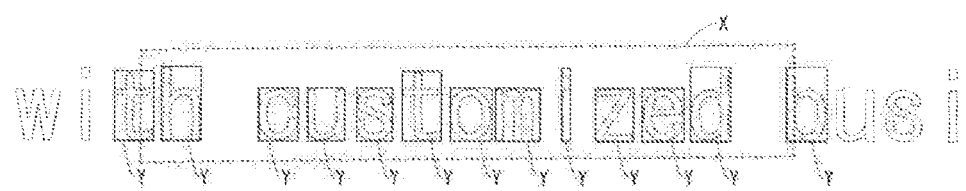
FIG. 6B is a diagram illustrating the edit-character-string identifying operations by the edit-character-string identifying section in FIG. 2.

In the example shown in FIG. 6B, the characters "th" of the word "with", all the characters of the word "customized", and the character "b" of the word "business" are positioned in the edit region X, and the character "h" of the word "with" and all the characters of the word "customized" are identified as candidate characters in step S202.

Figure 6C:
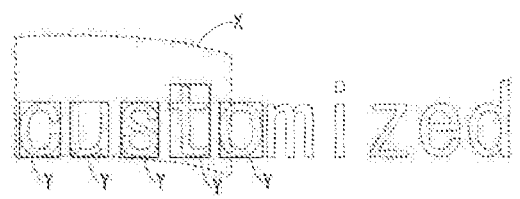
FIG. 6C is a diagram illustrating the edit-character-string identifying operations by the edit-character-string identifying section in FIG. 2.

In the example shown in FIG. 6C, the characters "custo" of the word "customized" are positioned in the edit region X, and the characters "cust" of the word "customized" are identified as candidate characters in step S202.

Figure 6D:
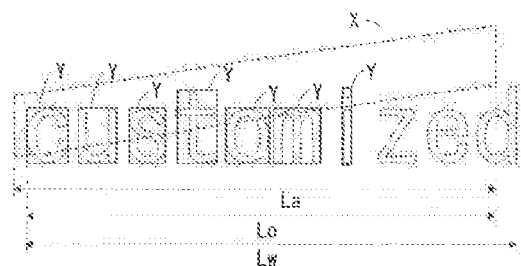
FIG. 6D is a diagram illustrating the edit-character-string identifying operations by the edit-character-string identifying section in FIG. 2.

In the example shown in FIG. 6D, the characters "customi" of the word "customized" are positioned in the edit region X, and the characters "cus" of the word "customized" are identified as candidate characters in step S202.

Then, the edit-character-string identifying section 74 determines whether an edit unit is set (step S203). In this embodiment, the edit character string can be identified word by word, sentence by sentence, or line by line, and these units are programmable as edit units. The image processing apparatus 1 can be configured to accept the edit unit set by a user; however, it is more preferable to configure the image processing apparatus 1 to set up an edit unit corresponding to the color and pattern (fill pattern or enclosure pattern) of the color mark. In this case, the edit units are associated with the colors and patterns of the color mark in advance, and when the edit region X is identified in step S102, an edit unit to be used for the identified edit region X is set.

If the edit unit is set to any one of a word unit, a sentence unit, and a line unit in step S203, the edit-character-string identifying section 74 identifies the candidate characters identified by the edit unit in step S202 as an edit character string (step S204), and completes the identifying operations.

Specifically, if the edit unit is a word unit, the word "customized" in the examples shown in FIGS. 4, 6A, 6C, 6D, and the word "with" and the word "customized" in the example shown in FIG. 6B are identified as an edit character string in step S204.

In addition, if the edit unit is a sentence unit, the sentence from "Harness" to "applications." is identified as an edit character string in all of the examples shown in FIGS. 4, and 6A to 6D.

Furthermore, if the edit unit is a line unit, the line from "Harness" to "business" is identified as an edit character string in all of the examples shown in FIGS. 4, and 6A to 6D.

If the edit unit is not set in step S203, the edit-character-string identifying section 74 calculates an occupancy ratio, which represents how much of the candidate characters identified in step S202 occupy a word, for every word positioned in the edit region X (step S205). The occupancy ratio is obtained by dividing the number of characters having an overlay ratio equal to or greater than the overlay threshold by the number of characters of the word.

Then, the edit-character-string identifying section 74 determines whether the candidate characters occupy a word at an occupancy ratio, obtained in step S205, equal to or greater than a predetermined occupancy threshold (0.8 in this embodiment) (step S206).

If it is determined in step S206 that the candidate characters occupy a word at an occupancy ratio equal to or greater than the occupancy threshold, the edit-character-string identifying section 74 identifies the word occupied with the candidate characters at an occupancy ratio equal to or greater than the occupancy threshold as an edit character string (step S207), and completes the identifying operations.

If it is determined in step S206 that the candidate characters do not occupy a word at an occupancy ratio equal to or greater than the occupancy threshold, the edit-character-string identifying section 74 identifies the candidate characters identified in step S202 as an edit character string (step S208), and completes the identifying operations.

In the examples shown in FIGS. 4 and 6A, the words "customized" are occupied at occupancy ratios of 1 and 0.9, respectively. Since both the occupancy ratios are equal to or greater than the occupancy threshold, the words "customized" are identified as an edit character string in step S207. In the example shown in FIG. 6B, the word "with" is occupied at an occupancy ratio of 0.25, and the word "customized" is occupied at an occupancy ratio of 0.9. Since only the word "customized" is occupied at an occupancy ratio equal to or greater than the occupancy threshold, only the word "customized" is identified as an edit character string in step S207.

This identifying operations can identify only a desired word as an edit character string, even if the color mark, which was applied by a user to specify the word, extends over the other line as shown in FIG. 4, or extends over characters before or after the desired word as shown in FIG. 6B. In addition, this identifying operations can identify only a desired word as an edit character string, even if the color mark, which was applied by a user to specify the word, does not fully cover the word as shown in FIG. 6A, but covers a certain amount of area of the word.

In the examples shown in FIGS. 6C and 6D, the words "customized" are occupied at occupancy ratios of 0.4 and 0.3, respectively. Since both the occupancy ratios are less than the occupancy threshold, the characters "cust" and "cus" in the respective words "customized" are identified as edit character strings in step S208.

Thus, the user can specify an edit character string on the basis of a word unit by using the color mark or other markings.

By the way, in the example shown in FIG. 6D, the edit region X is deviated greatly from the word "customized", and the length La of the edit region X in the direction of the line extends across almost the entire length Lw of the word "customized" in the line direction. This can be assumed to have occurred because the user intended to specify the word "customized", but mistakenly put the color mark partially off the word "customized". Therefore, it is preferable to configure the edit-character-string identifying section 74 to identify a word occupied at an occupancy ratio less than the occupancy threshold in step S206 as an edit character string. To achieve this, the word should have an overlap ratio, which represents how much of the word overlaps the edit region X in a line direction, equal to or greater than a predetermined overlap threshold (e.g., 0.8). The overlap ratio can be obtained by dividing a length Lo of a part of the word overlapping the edit region X in the line direction by a length Lw of the entire word in the line direction.

As described above, this embodiment is directed to the image processing apparatus 1 that performs image processing on image data, and includes an edit-region identifying section 71 identifying a user-specified region in the image data as an edit region X, a character-position identifying section 72 identifying the positions of individual characters in the image data, a character-region generating section 73 generating a character region Y for each of the characters whose positions have been identified by the character-position identifying section 72, an edit-character-string identifying section 74 identifying an edit character string based on candidate characters that are identified by determining the degree of overlay between the edit region X and character region Y, and an image processing unit 8 performing image processing on the edit character string identified by the edit-character-string identifying section 74.

According to this configuration, the image processing apparatus can identify a character string, which is desired to be specified by a user, as an edit character string by taking the degree of overlay between the edit region X and character region Y into consideration, and therefore, the edit character string can be precisely identified by the edit region X even though some parts of the character string to be edited are not included in the edit region X, or some parts of the nontarget character string are included in the edit region X. Specifically, this configuration can be used to mask only specified characters without masking unnecessary character regions and also without failing to fully mask the specified character region. This can prevent causing needless noise, truncated text, and some other problems associated with OCR processing, and consequently can enhance recognition performance.

Furthermore, the edit-character-string identifying section 74 in this embodiment calculates the overlay ratio of every character region Y overlaid on the edit region X, and identifies a character having an overlay ratio equal to or greater than the predetermined overlay threshold as a candidate character. In addition, the edit-character-string identifying section 74 can identify the centroid of every character region Y, and can identify the character whose centroid is positioned in the edit region X as a candidate character.

Furthermore, the edit-character-string identifying section 74 in this embodiment calculates an occupancy ratio representing how much of the candidate characters occupy a word for every word overlaid on the edit region X, and identifies a word occupied at an occupancy ratio equal to or greater than the predetermined occupancy threshold as an edit character string.

According to the configuration, the image processing apparatus can identify only a desired word as an edit character string even if, when a user specifies a word with a color mark, the user puts the color mark over other lines or over characters before and after the word. Also even if the word is not fully covered with the color mark, the image processing apparatus can identify only the user-desired word as an edit character string as long as a certain amount of area of the word is covered with the color mark.

In this embodiment, if there is no word occupied with candidate characters at an occupancy ratio equal to or greater than the occupancy threshold, the edit-character-string identifying section 74 identifies the candidate characters as an edit character string.

According to the configuration, the user can specify an edit character string even on the basis of a word unit by using a color mark or other markings.

In this embodiment, the edit-character-string identifying section 74 identifies a word occupied at an occupancy ratio less than the occupancy threshold as an edit character string if the word has an overlap ratio, representing how much of the word overlaps the edit region X in the line direction, equal to or greater than the predetermined overlap threshold.

According to the configuration, the image processing apparatus can identify the desired word as an edit character string even if the user tried to specify the word, but the user-specified region was greatly deviated from the word.

In this embodiment, when an edit unit is set, the edit-character-string identifying section 74 identifies the edit character string on the basis of the edit unit.

According to the configuration, the image processing apparatus can readily identify an edit character string on the basis of a word unit, sentence unit, or line unit set as a part of an edit unit by using the color mark or other markings.

In this embodiment, the user-specified region is specified with a color mark whose color and pattern are associated in advance with the edit unit, and the edit unit is set in accordance with the color and pattern of the color mark.

According to the configuration, the user can readily set the edit unit. In addition, the user can set a plurality of edit units by using different colors and patterns in a single document.

In this embodiment, the character-region generating section 73 generates a figure enclosing a character in a minimal area to generate a character region Y.

According to the configuration, the character region Y can be readily generated.

In this embodiment, the character-region generating section 73 generates a character region Y for characters positioned in the edit region X.

According to the configuration, the character region Y can be generated with a minimum load.

The present disclosure is not limited to the embodiment described above. It is apparent that various changes and modifications can be made within the scope of the technical idea of this disclosure. The number, position, and shape of constituent components described above are not limited to those described in the above embodiment. The number, position, and shape of the components can be properly selected to practice the present disclosure. The same reference numerals denote the same components throughout the accompanying drawings.

What is claimed is:

1. An image processing apparatus that performs image processing on image data, comprising:
   a control unit controlling the image processing apparatus, wherein
   the control unit executes:
   an edit-region identifying section identifying a user-specified region in the image data as an edit region;
   a character-position identifying section recognizing positions of individual characters in the image data;
   a character-region generating section generating a character area for each of the characters whose positions have been identified by the character-position identifying section;
   an edit-character-string identifying section identifying an edit character string based on candidate characters that are identified by determining the degree of overlay between the edit region and character region; and
   a processing unit performing image processing on the edit character string identified by the edit-character-string identifying section; and
   the edit-character-string identifying section calculates an occupancy ratio, representing how much of the candidate characters occupy a word, for every word overlaid on the edit region, and identifies a word occupied with the candidate characters at an occupancy ratio equal to or greater than a predetermined occupancy threshold as the edit character string.

2. The image processing apparatus according to claim 1, wherein
   when the character area is generated for each of the characters whose positions have been identified by the character-position identifying section, the height of the character area is regarded as an average height of character strings to define the character area.

3. The image processing apparatus according to claim 1, wherein
   the edit-character-string identifying section calculates an overlay ratio, representing how much of a character region is overlaid on the edit region, for each of the character regions overlaid on the edit region, and identifies a character having an overlay ratio equal to or greater than a predetermined overlay threshold as the candidate character.

4. The image processing apparatus according to claim 3, wherein
   the number of the candidate characters to be identified by the edit-character-string identifying section is limited to a predetermined range.

5. The image processing apparatus according to claim 1, wherein
   the edit-character-string identifying section identifies a centroid of each of the character regions and/or a centroid of each of the characters, and identifies a character whose character region has the centroid positioned in the edit region and/or whose centroid is positioned in the edit region as the candidate character.

6. The image processing apparatus according to claim 1, wherein
   if there is no word occupied with the candidate characters at an occupancy ratio equal to or greater than the occupancy threshold, the edit-character-string identifying section identifies the candidate characters as the edit character string.

7. The image processing apparatus according to claim 6, wherein
   the edit-character-string identifying section identifies a word occupied at an occupancy ratio less than the occupancy threshold as an edit character string if the word has an overlap ratio, representing how much of the word overlaps the edit region in a line direction, equal to or greater than a predetermined overlap threshold.

8. The image processing apparatus according to claim 1, wherein
   when a word occupied at an occupancy ratio equal to or greater than the occupancy threshold and a word occupied at an occupancy ratio less than the occupancy threshold are adjacent to each other, or when a word occupied at an occupancy ratio less than the occupancy threshold is sandwiched between words occupied at occupancy ratios equal to or greater than the occupancy threshold, the image processing apparatus checks with the user whether the word occupied at an occupancy ratio less than the occupancy threshold is to be identified as candidate characters.

9. The image processing apparatus according to claim 1, wherein
   when an edit unit is set, the edit-character-string identifying section identifies the edit character string on the basis of the edit unit.

10. The image processing apparatus according to claim 9, wherein
    the user-specified region is specified with a color mark whose color and pattern are associated in advance with the edit unit, and
    the edit unit is set in accordance with the color and pattern of the color mark.

11. The image processing apparatus according to claim 1, wherein
    the character-region generating section generates a predetermined figure enclosing a character in a minimal area as a character region.

12. The image processing apparatus according to claim 1, wherein
    the character-region generating section generates the character region for characters positioned in the edit region.

* * * * *